(12) United States Patent
Messer et al.

(10) Patent No.: US 11,138,845 B2
(45) Date of Patent: Oct. 5, 2021

(54) VIDEO SURVEILLANCE AND OBJECT RECOGNITION

(71) Applicant: Digital Barriers Services Ltd, London (GB)

(72) Inventors: Kieron John Messer, London (GB); Robert Bartholomew Lambert, London (GB)

(73) Assignee: DIGITAL BARRIERS SERVICES LTD, London (GB)

(*) Notice: Subject to any disclaimer, the term of this patent is extended or adjusted under 35 U.S.C. 154(b) by 218 days.

(21) Appl. No.: 16/152,631

(22) Filed: Oct. 5, 2018

(65) Prior Publication Data
US 2020/0105111 A1  Apr. 2, 2020

(30) Foreign Application Priority Data
Oct. 1, 2018 (GB) .................................. 1816018

(51) Int. Cl.
*G08B 13/196* (2006.01)
*G06K 9/00* (2006.01)
(Continued)

(52) U.S. Cl.
CPC ... *G08B 13/19613* (2013.01); *G06K 9/00221* (2013.01); *G06K 9/00228* (2013.01);
(Continued)

(58) Field of Classification Search
CPC .......... G06K 9/00771; G06K 9/00664; G06K 9/00624; G06K 9/00221; G06K 9/00288;
(Continued)

(56) References Cited

U.S. PATENT DOCUMENTS

2004/0117638 A1* 6/2004 Monroe ................... G07C 9/38
713/186
2004/0263621 A1* 12/2004 Guo ....................... H04N 7/188
348/143
(Continued)

FOREIGN PATENT DOCUMENTS

EP       3321844 A1    5/2018
KR    20170119379 A   10/2017
(Continued)

OTHER PUBLICATIONS

"May." Merriam-Webster.com Dictionary, Merriam-Webster, www.merriam-webster.com/dictionary/may. Accessed Nov. 3, 2020. (Year: 2020).*
(Continued)

*Primary Examiner* — Shefali D Goradia
(74) *Attorney, Agent, or Firm* — Lando & Anastasi, LLP

(57) ABSTRACT

An object recognition enabled, for example facial recognition enabled, video surveillance system for capturing video of a scene and allowing recognition of objects within that scene. The system comprises at least one camera apparatus connected via a communication channel to a central server with the camera apparatus arranged for capturing visual representation data of a scene. The visual representation data comprises video of the scene and the camera apparatus comprises a camera for capturing said video and a video encoder for sending corresponding video data via the communication channel to the central server. The camera apparatus is further arranged for generating object recognition data based on said visual representation data, and the video encoder is arranged to send said object recognition data along with the video data via the communication channel.

40 Claims, 6 Drawing Sheets

(51) Int. Cl.
  *G06K 9/62* (2006.01)
  *H04N 5/232* (2006.01)
  *H04N 7/08* (2006.01)
(52) U.S. Cl.
  CPC ....... *G06K 9/00771* (2013.01); *G06K 9/6267* (2013.01); *G08B 13/19656* (2013.01); *G08B 13/19663* (2013.01); *G08B 13/19678* (2013.01); *H04N 5/23219* (2013.01); *H04N 7/08* (2013.01); *G06K 9/00288* (2013.01)
(58) Field of Classification Search
  CPC ........ G08B 13/19663; G08B 13/19613; G08B 13/19678; G08B 13/19656; G08B 13/19643; H04N 5/23219; H04N 7/08; H04N 7/188
  USPC ......................................................... 382/118
  See application file for complete search history.

(56) References Cited

U.S. PATENT DOCUMENTS

| | | | | |
|---|---|---|---|---|
| 2009/0066790 | A1* | 3/2009 | Hammadou | G08B 13/19636 348/143 |
| 2010/0074324 | A1* | 3/2010 | Qian | H04L 47/10 375/240.02 |
| 2012/0133773 | A1 | 5/2012 | Brogren et al. | |
| 2014/0015964 | A1* | 1/2014 | Chew | H04N 5/77 348/143 |
| 2016/0182850 | A1* | 6/2016 | Thompson | H04N 1/00106 348/158 |
| 2016/0350587 | A1* | 12/2016 | Bataller | H04N 7/18 |
| 2017/0076140 | A1* | 3/2017 | Waniguchi | H04N 5/23219 |
| 2018/0121738 | A1 | 5/2018 | Womack et al. | |
| 2018/0137362 | A1 | 5/2018 | Danielsson et al. | |
| 2018/0157939 | A1* | 6/2018 | Butt | H04N 21/466 |
| 2018/0349684 | A1* | 12/2018 | Bapat | G06K 9/00362 |
| 2019/0138795 | A1* | 5/2019 | Vaidya | H04N 7/183 |
| 2019/0138841 | A1* | 5/2019 | Wang | G06K 9/6201 |
| 2019/0278976 | A1* | 9/2019 | Khadloya | G06K 9/6262 |

FOREIGN PATENT DOCUMENTS

| | | |
|---|---|---|
| WO | 2016128701 A1 | 8/2016 |
| WO | 2017064457 A1 | 4/2017 |
| WO | 2018081581 A1 | 5/2018 |

OTHER PUBLICATIONS

"Say." Merriam-Webster.com Dictionary, Merriam-Webster, www.merriam-webster.com/dictionary/say. Accessed Nov. 3, 2020. (Year: 2020).*

"A Guide to MPEG Fundamentals and Protocol Analysis." Tektronix, download.tek.com/document/25W-11418-10.pdf. Accessed Nov. 4, 2020. (Year: 2018).*

Fatemi, H., Kleihorst, R. P., Corporaal, H., & Jonker, P. P. (2003). Real-Time Face Recognition on a Smart Camera. In Proceedings of Advanced Concepts for Intelligent Vision Systems 2003 (pp. 222-227) (Year: 2003).*

Hu, Roland, et al. "Design and implementation of a surveillance camera system with face recognition functionality." 2014 IEEE International Conference on Electron Devices and Solid-State Circuits. IEEE, 2014. (Year: 2014).*

Press Release: Digital Barriers Launches World's First Live Facial Recognition from Body-Worn Cameras, Jul. 17, 2017. http://www.digitalbarriers.com/new/digital-barriers-launches-worlds-first-live-facial-recognition-body-worn-cameras/.

* cited by examiner

VIDEO SURVEILLANCE AND OBJECT RECOGNITION

CROSS-REFERENCE TO RELATED APPLICATION

This application claims priority under 35 U.S.C. § 119 to GB1816018.4, filed on Oct. 1, 2018, the entire content of which is hereby incorporated herein by reference in its entirety for all purposes.

This invention relates to video surveillance systems and apparatus for use in such systems which facilitate the recognition of objects in a scene being monitored by the video surveillance system.

In various circumstances there is a desire to provide video surveillance of a scene, as well as, to facilitate object recognition. Examples of object recognition include facial recognition and vehicle registration number recognition.

Various limitations can apply when attempting to meet both a desire for providing visual surveillance and a potential for object recognition. These can be particularly acute when it is desired to provide mobile units for providing visual surveillance and/or object recognition. For example, Enforcement Officers in various roles may wear body worn cameras and it would be desirable to provide video surveillance and the possibility of object recognition, say facial recognition, whilst making use of such body worn cameras.

With such devices there can be restrictions both in terms of the communications which are available for the device, as well as, the capability of the device itself.

Typically, only relatively low bandwidth or variable quality channels such as Wi-Fi, Bluetooth or mobile networks such as 4G networks will be available for communication with such devices. Furthermore, the processing capability and power of mobile devices, for example, body worn camera units can be limited.

Thus, typically whilst body worn cameras may be useful for recording video of a scene, it is difficult to make use of them for providing facial recognition functionality particularly in a "real time" way.

Furthermore, if communications are put in place to allow live video surveillance to be used from mobile cameras such as body worn cameras, then it is highly desirable that this can be maintained whilst any object recognition, say facial recognition, activity is carried out.

Probably uppermost as a problem is how to allow video surveillance and the provision of facial recognition based on visual data captured by a relatively low powered device with a relatively poor communication channel and give a real time indication as to when a face is recognised to a user of that device. Thus, for example, how to allow use of a body worn camera to provide video surveillance, facial recognition and real time feedback to the operator of that device.

Trying to conduct facial recognition over a large watch list at a mobile device is unlikely to be practical but at the same time the quality of video that can be captured and transmitted back to a central system for processing in real time is unlikely to be sufficient to allow accurate facial recognition at a central location. Similar considerations also apply to different forms of object recognition.

It is the aim of the present invention to attempt to address these types of issue.

According to one aspect of the present invention there is provided an object recognition enabled video surveillance system for capturing video of a scene and allowing recognition of objects within that scene, the system comprising at least one camera apparatus connected via a communication channel to a central server, the camera apparatus arranged for capturing visual representation data of a scene, the visual representation data comprising video of the scene and the camera apparatus comprising a camera for capturing said video and a video encoder for sending corresponding video data via the communication channel to the central server, the camera apparatus being further arranged for generating object recognition data based on said visual representation data, and the video encoder being arranged to send said object recognition data along with the video data via the communication channel.

This can allow use of a relatively low bandwidth communication channel to both provide live video of a scene to a remote location and allow recognition of objects in that scene to be determined and/or indicated at a remote location even though recognition based on the live video received at the remote location might not be feasible. That is the video data sent via the communications channel may allow only the regeneration of video at the remote location that has a resolution or another quality factor that is insufficient to allow effective object recognition based on that received data. By sharing the video data communication channel with object recognition data this issue can be overcome.

The communication channel may comprise at least one wireless communication channel leg. The wireless communication channel leg may, for example, be provided by at least one of a mobile communication network, such as a 5G, 4G, 3G network, or wifi network or a shorter range link such as say Bluetooth.

The surveillance system may be arranged to carry out a two stage object recognition process comprising a first object detection process and a second object classification process.

The camera apparatus be arranged for generating object recognition data based on part of the visual representation data which is distinct from the video data.

The visual representation data may comprise said video data and auxiliary visual representation data. The camera apparatus be arranged for generating object recognition data based on the auxiliary visual representation data. The auxiliary visual representation data may comprise image data. The auxiliary visual representation data may comprise auxiliary video data with a higher resolution or other quality factor than said video data. Thus say video data with a first quality may be captured and streamed to the server as "said video data" and video data with a second, higher, quality may be used in generating object recognition data. "Said video data" might also be termed "primary video data", or "surveillance video data", or where appropriate "real time video data" or "live video data" or "low quality video data". The object recognition data may comprise a video clip data set and/or the object recognition data may be generated from a video clip data set. That is a short segment of video, ie a clip, typically of a second, higher, quality, may be used.

The visual representation data may comprise image data. Said camera may be arranged for capturing images as well as video. In an alternative a separate camera may be provided for capturing images. The image data may comprise or be generated from at least one frame taken from captured video data.

The camera apparatus may be further arranged for capturing images of said scene and generating object recognition data based on said captured images. The object recognition data may comprise captured image data.

The camera apparatus may comprise an object detection module for detecting the presence of objects of interest in said visual representation data say said captured images or video clips.

Any one image or clip might include more than one object of interest and each of these might be handled by the camera apparatus/system as described herein.

The camera apparatus may be arranged to send captured image data as object recognition data where the captured image data corresponds to a captured image in which an object of interest has been detected by the object detection module.

The camera apparatus may be arranged to send captured video clip data as object recognition data where the captured video clip data corresponds to a captured video clip in which an object of interest has been detected by the object detection module.

In this way the camera apparatus can make an initial determination that an object of interest is or may be present in the scene and then send a corresponding image or clip to a remote location, say the server where further processing may take place.

The camera apparatus may be arranged to capture images as stills/frames from the captured video of the scene. The camera apparatus may be arranged to capture images as prime images independently of the captured video.

The camera apparatus may comprise an object recognition module for classifying objects in captured images and/or video clips. Preferably the object recognition module is arranged to process captured image data/video clip data which corresponds to a captured image/captured video clip in which an object of interest has been first detected by the object detection module, to thereby classify objects of interest.

Thus in some cases complete object recognition may take place at the camera apparatus for at least some objects. Even when this is the case, then where desired objection recognition in respect of such an object may also be carried out at a remote location. As an example further processing in respect of particular an image/video clip and/or a particular object may be carried out at a remote location—this say may serve to give rise to a higher degree of certainty of identification and/or a higher degree of classification/specificity of what has been identified. As a very specific simplified example, at the camera apparatus the item to be identified may be a red car, whereas at the remote location the item to be identified might be a red car of a specific make or model.

The object recognition module at the camera apparatus may be arranged to conduct object recognition against a first watch list of objects held at the camera apparatus and the object recognition module may be arranged to generate an object recognised alert when an object of interest is found to match with an object on the first watch list.

Where object recognition is conducted at the camera apparatus, the object recognition data may comprise an object recognised alert when an object of interest is found to match with an object on the first watch list.

In some embodiments:
i) the object recognition module at the camera apparatus is arranged to conduct object recognition against a first watch list of objects held at the camera apparatus and the object recognition module is arranged to generate an object recognised alert when an object of interest is found to match with an object on the first watch list and the camera apparatus is arranged to send said object recognised alerts as object recognition data; and ii) the camera apparatus is arranged to send captured image data/captured video clip data as object recognition data where the captured image data/captured video clip data corresponds to a captured image/video clip in which an object of interest has been detected by the object detection module but the object of interest is found to not match with an object on the first watch list.

In other embodiments:
i) the object recognition module at the camera apparatus is arranged to conduct object recognition against a first watch list of objects held at the camera apparatus and the object recognition module is arranged to generate an object recognised alert when an object of interest is found to match with an object on the first watch list and the camera apparatus is arranged to send said object recognised alerts as object recognition data; and ii) the camera apparatus is arranged to send captured image data/captured video clip data as object recognition data where the captured image data/captured video clip data corresponds to a captured image/video clip in which an object of interest has been detected by the object detection module both when the object of interest is found to match with an object on the first watch list and when the object of interest is found to not match with an object on the first watch list.

The server may be arranged to conduct object recognition against a main watch list of objects held at the server based on captured image data and/or video clip data supplied from the camera apparatus.

In the case of some camera apparatus all object recognition may be conducted at the respective camera apparatus.

In the case of some camera apparatus some object recognition will be conducted at the camera apparatus and some at the server. As mentioned above in some cases object recognition in respect of particular an image/video clip and/or a particular object may be carried out at the camera apparatus and the server.

In the case of some camera apparatus all object recognition will be conducted at the server.

In some cases, the main watch list can be the only watch list. In other cases the main watch list will be supplemental to or include the first watch list. In some cases there will be overlap between the first watch list and the main watch list, this may be partial overlap or complete overlap—that is the first watch list may be a subset of the main watch list. In some cases objects on the main watch list may be defined to greater degree of classification than the first watch list. Thus there might be partial or complete overlap in the watch lists in terms of the objects covered, but the degree of classification for at least some of those objects may differ between the watchlists.

The system may be arranged for determining the content of the first watch list for provision to the camera apparatus in dependence on:
the content of the main watch list; and
at least one of the following factors:
i) at least one capability of the camera apparatus as detected by the system;
ii) a priority value given to objects on the main watch list;
iii) the quality of enrollment images held in respect of objects on the main watch list.

In this way the content of the first watch list to be provided and held on the camera apparatus may be automatically, and if desired dynamically, determined.

The system may be arranged for delivery of the first watch list to the camera apparatus. This may be over said communication channel.

As is well known many object recognition systems make use of enrollment images of objects of interest which may be used in the recognition processing in respect of captured images—"probe images"—of possible matches to the object of interest.

It is this type of enrollment image which is referred to above.

There is an industry standard "ISO score" indicated quality for images used as enrollment and/or probe images. The ISO score may be used as the measure of quality of the enrollment images in the above step. Objects with higher quality enrollment images may be prioritised for inclusion on the first watch list over those with lower quality enrollment images. This is on the basis that if there are limited resources at the camera apparatus, these are best used in recognition processing that is likely to yield a positive result.

Said at least one capability of the camera apparatus may comprise available processing power and/or battery power.

The video surveillance system may comprise a watch list database comprising enrollment images in respect of objects in the watch list and the video surveillance system may be arranged for treating the captured image or video clip as a probe image and conducting object recognition by processing the enrollment images and probe images.

The video surveillance system may be further arranged for determining a quality of each enrollment image and/or each probe image and using said determined quality in conducting object recognition.

The determined quality may be the ISO score for the image.

The video surveillance system may be arranged to control when the object recognition process indicates that a probe image matches an enrollment image (ie indicates that an object has been identified) in dependence on the determined quality of the enrollment image and/or the probe image.

This may be used to avoid the generation of matches where image quality is low to help minimise false alerts. The system may be arranged to adjust a threshold of results of a recognition process which will be considered to be a valid match based on the image quality of one or both images, that is to say, the quality of the enrollment image and/or the probe image.

The or each threshold might be different for different watch-lists. The or each threshold might be automatically set or adjustable by the operator using a graphical interface.

The video surveillance system may be arranged so that where the object recognition process indicates that a probe image matches an enrollment image (ie indicates that an object has been identified) further operation of the surveillance system is dependent on the determined quality of the enrollment image and/or the probe image.

This may be used to help minimise false alerts—say ignoring, or downgrading, or seeking further verification of, a match if image quality of one or both images is below a respective threshold or thresholds. Such verification might involve human intervention or be carried out by the system—say by making use of other available data and/or other available images.

Similarly this may be used to prioritise or filter alerts where a match is found and image quality of one or both images is above a respective threshold or thresholds.

The surveillance system may be arranged to issue a prompt to acquire a further image/video clip in response to a match being found using a first image.

In a particular example the surveillance system may comprise at least one first, say fixed or vehicle mounted, camera apparatus and at least one mobile, say body worn, camera apparatus and the system may be arranged to issue a prompt to the operator of the mobile camera apparatus to seek to acquire a second image/video clip of an object in respect of which an image/video clip has already been captured by the first camera which resulted in a match against a watch list.

The system may be arranged to issue such a prompt where the determined quality of the initial image/video clip is below a threshold and/or a certainty score associated with the initial match is below a threshold. The system may be arranged to issue such a prompt where a priority associated with the object in the watch list matches or exceeds a predetermined level.

When a second image/video clip is acquired this may be used as a probe image for the recognition process. This may be conducted against the enrollment image and/or the first image/video clip. This may occur at the mobile camera apparatus or centrally or in some combination.

The results of this process may be output by the system to a remote user or the operator of the mobile device.

The output may include output of the enrollment image and/or output of the first probe image and/or output of the second probe image.

The system, and in at least some cases in particular the camera apparatus, may comprise trigger means for triggering the capture of images and/or video clips.

The trigger means may comprise a manually operated trigger control. This may be operated by a user to capture an image and/or a video clip. The manually operated trigger control may comprise a button which may be disposed on the camera apparatus.

The trigger means may comprise a triggering module for triggering capture of an image/video clip based on predetermined conditions. The camera apparatus may comprise the triggering module.

In some embodiments the object detection module may be arranged for carrying out object detection on candidate captured images and/or candidate captured video clips and the triggering module may be arranged to trigger capture of an image and/or a video clip when the object detection module detects an object of interest in a respective candidate captured image and/or video clip. Thus the trigger means may comprise the or an object detection module.

Thus in some cases the object detection module may be continuously monitoring images and/or video clips as candidate captured images and/or video clips and when an object of interest is detected an image and/or video clip may be captured.

This might involve a separate capture of an image and/or video clip based on the detection of an object of interest in the candidate captured image and/or video clip—the separate captured image and/or video clip may in that case have a higher resolution or other higher quality factor than the candidate captured image and/or video clip.

In another alternative the candidate captured image and/or video clip may be treated as a captured image and/or video clip after an object of interest has been detected. In such a case the captured image and/or video clip may have the same characteristics, ie may be the same image and/or video clip as the corresponding candidate captured image and/or video clip.

Candidate images and/or video clips may be discarded when no object of interest is detected in the respective image and/or video clip.

In each case candidate captured images and/or video clips may be stored in temporary storage and move to more permanent storage and/or flagged as captured images and/or video clips after an object of interest has been detected.

The trigger means may comprise sensing means for sensing a physical parameter in the region of said scene. The triggering module may be arranged for triggering capture of an image and/or video clip when a sensed physical parameter meets predetermined conditions.

The trigger means may comprise sensing means for sensing when a predetermined object or type of object moves relative to a predetermined location. In one particular embodiment the trigger means may comprise a sensing arrangement arranged to sense when a weapon is removed from a storage location. As an example this might apply when an enforcement officer removes a weapon from a holster, and the weapon and/or the holster may be equipped with all or part of a sensing arrangement for sensing if the weapon is drawn from the holster.

The trigger means may comprise audio detection means for detecting sounds in the region of said scene. The triggering module may be arranged for triggering capture of an image when detected sounds meet predetermined conditions. The predetermined conditions may for example, comprise the volume, frequency or other characteristics of the detected sound. The predetermined conditions might include results of speech or voice recognition.

The trigger means may comprise components remote from the camera apparatus. In some embodiments the triggering module may be provided at the camera apparatus and the predetermined conditions may comprise the receipt of a signal from a remote location—say from the server.

This could, for example, allow a user remote from the camera apparatus to trigger capture of an image and/or video clip, and/or allow processing of data at a remote location to cause the capture of an image and/or video clip.

Most typically the camera apparatus will be used to output captured video as live video via the video encoder so that this video may be monitored and/or recorded at a remote location. As such the object recognition data is sent along with the live video.

The camera apparatus may be arranged to record video and store the recorded video on storage means. The camera apparatus may be arranged to allow later play back of recorded video and may be arranged to allow sending of recorded video via the video encoder either as it is played back or otherwise.

The camera apparatus may be arranged to allow the capture of images and/or video clips from recorded video, say as this is playback at the camera apparatus. Such captured images and/or video clips may then be treated/processed as described above in the same way as images and/or video clips captured when live video is being captured and corresponding object recognition data relating to such captured images and/or video clips may be sent along with the recorded video where this is sent via the video encoder.

The server may be arranged to send packages of data to end user devices for allowing end users to view video received from camera apparatus and/or for allowing end users to be informed of object recognition events. The server may be arranged to add meta data which relates to an object that has been recognised to at least some such packages of data.

The meta data may include GPS data, image/video analytics data, unique ID data, location data indicating a region of interest in an image—eg of a detected face, time-stamp data, device data, etc.

The video encoder may be arranged to prioritise the sending of video, in particular, live video over object recognition data.

The video encoder may comprise a compressor to compress video data. The compressor may be arranged to compress video data using an adjustable compression factor.

The video encoder may comprise a packet constructor configured to receive compressed video data from the compressor, to receive object recognition data, to queue the compressed video data and object recognition data for transmission, to construct data packets from the queued data, and to transmit the constructed data packets over the channel.

The video encoder may comprise a channel monitor configured to monitor the performance of the channel based on the behaviour of transmitted data packets, and the compressor may be configured to modify the adjustable compression factor in response to the performance of the channel, as determined by the channel monitor.

The video compressor may be arranged to modify the compression factor in response to the amount of object recognition data received by the packet constructor.

The video compressor may be arranged to modify the compression factor in response to performance of the channel and the amount of object recognition data received by the packet constructor.

The objects of interest can in principle be anything which it is desired to monitor, detect and recognise. Specific examples include faces—ie people, vehicle registration numbers, weapons. Various tools and algorithms are available for recognising objects. The precise nature and functionality of these is outside the scope of this application and not important to functioning of the ideas—that is to say any one of a number of commercially available recognition technologies—say facial recognition technologies may be used as part of a system embodying the present ideas. Similar considerations apply to object detection say face detection.

In an example of particular interest, the objects of interest may be faces, ie human faces, such that the system may allow facial recognition. The object recognition data may be facial recognition data.

The object recognition enabled video surveillance system may be a facial recognition enabled video surveillance system for capturing video of a scene and allowing recognition of faces within that scene.

Correspondingly, the surveillance system may be arranged to carry out a two stage facial recognition process comprising a first face detection process and a second face recognition process.

Further the camera apparatus may comprise a face detection module for detecting the presence of faces in said captured images and/or video clips.

The object recognition data may comprise captured image and/or video clip data for images and/or video clips in which faces have been detected.

The camera apparatus may be arranged to send captured image and/or video clip data as object recognition data where the captured image and/or video clip data corresponds to a captured image and/or video clip in which a face has been detected by the face detection module.

In this way the camera apparatus can make an initial determination that face is or may be present in the scene and then send a corresponding image or video clip to a remote location, say the server where further processing may take place.

The camera apparatus may comprise a facial recognition module for performing facial recognition on faces in captured images and/or video clips. Preferably the facial recognition module is arranged to process captured image and/or video clip data which corresponds to a captured image and/or video clip in which a face has been first detected by the face detection module.

The facial recognition module at the camera apparatus may be arranged to conduct facial recognition against a first watch list held at the camera apparatus and the facial recognition module may be arranged to generate an alert when a face is found to match with the first watch list.

The object recognition data may comprise data representing the results of facial recognition at the camera apparatus.

In some cases complete facial recognition may take place at the camera apparatus for at least some faces. Even when this is the case, then where desired facial recognition in respect of such a face may also be carried out at a remote location. As an example further processing in respect of particular an image/video clip and/or a particular face may be carried out at a remote location—this say may serve to give rise to a higher degree of certainty of identification.

The facial recognition module at the camera apparatus may be arranged to conduct facial recognition against a first watch list held at the camera apparatus and the facial recognition module may be arranged to generate an alert when a face is found to match with the first watch list.

Where facial recognition is conducted at the camera apparatus, the object recognition data may comprise a face recognised alert when a face is found to match with the first watch list.

In some embodiments:
i) the facial recognition module at the camera apparatus is arranged to conduct facial recognition against a first watch list held at the camera apparatus and the facial recognition module is arranged to generate a face recognised alert when a face is found to match with the first watch list and the camera apparatus is arranged to send said face recognised alerts as object recognition data; and
ii) the camera apparatus is arranged to send captured image and/or video clip data as object recognition data where the captured image and/or video clip data corresponds to a captured image and/or video clip in which face has been detected by the face detection module but the face is found to not match with the first watch list.

In other embodiments:
i) the facial recognition module at the camera apparatus is arranged to conduct facial recognition against a first watch list held at the camera apparatus and the facial recognition module is arranged to generate a face recognised alert when a face is found to match with the first watch list and the camera apparatus is arranged to send said face recognised alerts as object recognition data; and
ii) the camera apparatus is arranged to send captured image and/or video clip data as object recognition data where the captured image and/or video clip data corresponds to a captured image and/or video clip in which face has been detected by the face detection module both when the face is found to match with the first watch list and when the face is found to not match with the first watch list.

The server may be arranged to conduct facial recognition against a main watch list held at the server based on captured image and/or video clip data supplied from the camera apparatus.

In the case of some camera apparatus all facial recognition may be conducted at the respective camera apparatus.

In the case of some camera apparatus some facial recognition will be conducted at the camera apparatus and some at the server.

In the case of some camera apparatus all facial recognition will be conducted at the server. As mentioned above in some cases facial recognition in respect of particular an image/video clip and/or a particular face may be carried out at the camera apparatus and the server.

In some cases the main watch list can be the only watch list. In other cases the main watch list will be supplemental to or include the first watch list. In some cases there will be overlap between the first watch list and the main watch list, this may be partial overlap or complete overlap—that is the first watch list may be a subset of the main watch list. In some cases faces on the main watch list may be defined to greater degree of classification than the first watch list. Thus there might be partial or complete overlap in the watch lists in terms of the faces covered, but the degree of classification for at least some of those faces may differ between the watchlists.

The system may be arranged for determining the content of the first watch list for provision to the camera apparatus in dependence on:
the content of the main watch list; and
at least one of the following factors:
i) at least one capability of the camera apparatus as detected by the system;
ii) a priority value given to faces on the main watch list;
iii) the quality of enrollment images held in respect of faces on the main watch list.

In this way the content of the first watch list to be provided and held on the camera apparatus may be automatically, and if desired dynamically, determined.

The system may be arranged for delivery of the first watch list to the camera apparatus. This may be over said communication channel.

As is well known many facial recognition systems make use of enrollment images of faces of people of interest which may be used in the recognition processing in respect of captured images—"probe images"—of possible matches to the face of interest.

It is this type of enrollment image which is referred to above.

There is an industry standard "ISO score" indicated quality for images used as enrollment and/or probe images. The ISO score may be used as the measure of quality of the enrollment images in the above step. Faces with higher quality enrollment images may be prioritised for inclusion on the first watch list over those with lower quality enrollment images. This is on the basis that if there are limited resources at the camera apparatus, these are best used in recognition processing that is likely to yield a positive result.

Said at least one capability of the camera apparatus may comprise available processing power and/or battery power.

The video surveillance system may comprise a watch list database comprising enrollment images in respect of faces in the watch list and the video surveillance system may be arranged for treating the captured image or video clip as a probe image and conducting facial recognition by processing the enrollment images and probe images.

The video surveillance system may be further arranged for determining a quality of each enrollment image and/or each probe image and using said determined quality in conducting facial recognition.

The determined quality may be the ISO score for the image.

The video surveillance system may be arranged to control when the facial recognition process indicates that a probe image matches an enrollment image (ie indicates that a face has been identified) in dependence on the determined quality of the enrollment image and/or the probe image.

This may be used to avoid the generation of matches where image quality is low to help minimise false alerts. The system may be arranged to adjust a threshold of results of a recognition process which will be considered to be a valid match based on the image quality of one or both images, that is to say, the quality of the enrollment image and/or the probe image.

The or each threshold might be different for different watch-lists. The or each threshold might be automatically set or adjustable by the operator using a graphical interface.

The video surveillance system may be arranged so that where the facial recognition process indicates that a probe image matches an enrollment image (ie indicates that a face has been identified) further operation of the surveillance system is dependent on the determined quality of the enrollment image and/or the probe image.

This may be used to help minimise false alerts—say ignoring, or downgrading, or seeking further verification of, a match if image quality of one or both images is below a respective threshold or thresholds. Such verification might involve human intervention or be carried out by the system—say by making use of other available data and/or other available images.

Similarly this may be used to prioritise or filter alerts where a match is found and image quality of one or both images is above a respective threshold or thresholds.

The surveillance system may be arranged to issue a prompt to acquire a further image/video clip in response to a match being found using a first image.

In a particular example the surveillance system may comprise at least one first, say fixed or vehicle mounted, camera apparatus and at least one mobile, say body worn, camera apparatus and the system may be arranged to issue a prompt to the operator of the mobile camera apparatus to seek to acquire a second image/video clip of a face in respect of which an image/video clip has already been captured by the first camera which resulted in a match against a watch list.

The system may be arranged to issue such a prompt where the determined quality of the initial image/video clip is below a threshold and/or a certainty score associated with the initial match is below a threshold. The system may be arranged to issue such a prompt where a priority associated with the object in the watch list matches or exceeds a predetermined level.

When a second image/video clip is acquired this may be used as a probe image for the recognition process. This may be conducted against the enrollment image and/or the first image/video clip. This may occur at the mobile camera apparatus or centrally or in some combination.

The results of this process may be output by the system to a remote user or the operator of the mobile device.

The output may include output of the enrollment image and/or output of the first probe image and/or output of the second probe image.

Artificial intelligence might be used in implementing one or more of the detection module, the recognition module, the triggering means.

The system may be arranged to allow the collection of, storage of, and later output of video data relating to a scene.

Thus as well as the provision of live video data, video can be captured for later use. This might be stored at the camera apparatus and later extracted and/or stored at a remote location such as the server. As such output to a user (either an operator of a camera apparatus, and/or a remote user) can include recorded video of the scene.

It will be appreciated that all the features described above in the general context of object detection and recognition are relevant to face detection and recognition and could be re-written here as corresponding features. This is not done merely in the interest of brevity.

According to another aspect of the present invention there is provided camera apparatus for use in an object recognition enabled video surveillance system for capturing video of a scene and allowing recognition of objects within that scene, the camera apparatus being arranged for communication with a central server via a communication channel and arranged for capturing visual representation data of a scene, the visual representation data comprising video of the scene and the camera apparatus comprising a camera for capturing said video and a video encoder for sending corresponding video data via the communication channel to the central server, the camera apparatus being further arranged for generating object recognition data based on said visual representation data, and the video encoder being arranged to send said object recognition data along with the video data via the communication channel.

Typically, the camera apparatus will be arranged under the control of software to perform the functions defined above.

According to another aspect of the present invention there is provided a central server arranged under the control of software for use in an object recognition enabled video surveillance system for capturing video of a scene and allowing recognition of objects within that scene, the central server being arranged for communication with at least one camera apparatus via a communication channel and being arranged under the control of software for:

receiving video data via the communication channel from the at least one camera;

receiving object recognition data along with the video data via the communication channel from the at least one camera;

and outputting to at least one end user device packages of data for allowing end users to view video received from the camera apparatus and/or for allowing end users to be informed of object recognition events.

The server may be arranged to add meta data which relates to an object that has been recognised to at least some such packages of data.

According to another aspect of the present invention there is provided a facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server, the camera apparatus being further arranged for capturing images of said scene and generating facial recognition data based on said captured images, and the video encoder being arranged to send said facial recognition data along with the video data via the communication channel.

According to another aspect of the present invention there is provided a facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server, the camera apparatus being further arranged for capturing images and/or video clips of said scene and generating facial recognition data based on said captured images and/or video clips, and the video encoder being arranged to send said facial recognition data along with the video data via the communication channel.

As defined above the facial recognition data may comprise image data and/or video clip data on which facial recognition may be conducted remotely and/or may comprise data which results after a full facial recognition process at the camera apparatus.

According to another aspect of the present invention there is provided a facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server for reconstruction of video at a first quality, the camera apparatus being further arranged for capturing video clips of said scene at a second quality which is higher than the first and generating facial recognition data based on said captured video clips, and the video encoder being arranged to send said facial recognition data along with the video data via the communication channel.

The facial recognition data may comprise video data for allowing reconstruction of said video clips at a quality which is higher than said first quality.

According to another aspect of the present invention there is provided a facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server, the camera apparatus being further arranged for capturing images of said scene and comprising a face detection module for detecting faces in said captured images, the camera apparatus being arranged to generate detected face image data sets in response to detection of faces by the face detection module, each detected face image data set including image data in respect of a detected face, and the video encoder being arranged to send said detected face image data sets along with the video data via the communication channel.

According to another aspect of the present invention there is provided a facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server, the camera apparatus being further arranged for capturing images and/or video clips of said scene and comprising a face detection module for detecting faces in said captured images and/or video clips, the camera apparatus being arranged to generate detected face image/video data sets in response to detection of faces by the face detection module, each detected face image/video data set including image/video data in respect of a detected face, and the video encoder being arranged to send said detected face image/video data sets along with the video data via the communication channel.

The surveillance system may further comprise at least one facial recognition module for processing the detected face image data sets to identify faces therefrom.

In some embodiments a facial recognition module may be provided at a least one camera apparatus. In other embodiments a facial recognition module may be provided at the central server. In yet further embodiments a facial recognition module may be provided at the central server and a facial recognition module may be provided at a least one camera apparatus.

According to another aspect of the present invention there is provided a facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server, the camera apparatus being further arranged for capturing images of said scene and comprising a face detection module for detecting faces in said captured images, the camera apparatus being arranged to generate detected face image data sets in response to detection of faces by the face detection module, each detected face image data set including image data in respect of a detected face, the surveillance system further comprising a facial recognition module for processing the detected face image data sets to identify faces therefrom.

According to another aspect of the present invention there is provided a facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server, the camera apparatus being further arranged for capturing images and/or video clips of said scene and comprising a face detection module for detecting faces in said captured images and/or video clips, the camera apparatus being arranged to generate detected face image/video data sets in response to detection of faces by the face detection module, each detected face image/video data set including image/video data in respect of a detected face, the surveillance system further comprising a facial recognition module for processing the detected face image/video data sets to identify faces therefrom.

According to another aspect of the present invention there is provided a computer program or set of computer programs which when loaded and run on a computer of a camera apparatus, and/or a server cause the camera apparatus or server or surveillance system including the camera apparatus and the server to operate as camera apparatus, a server or a surveillance system including camera apparatus and a central server as defined above.

According to another aspect of the present invention there is provided at least one machine readable data carrier carrying a computer program or set of computer programs as defined above.

The machine readable data carrier may be a physical media computer program product.

In general, the video of the scene which is captured as mentioned in the aspects of the invention above will be live video which can be communicated as live video with minimised latency. On the other hand, where video clips are taken, these will typically be handled separately and not sent live/in real time. With that data the quality of the data sent is important and speed is less of the essence, thus whilst the data of such a clip will still comprise video data, it does not need to be sent, and typically not be sent as part of the "video data" mentioned in the aspects of the invention above—it will not be streamed as part of the video data—rather in this context this clip data will be object recognition data sent "at high quality but slowly" rather than "at low quality but quickly".

Note that in general each of the optional features following each of the aspects of the invention above is equally applicable as an optional feature in respect of each of the other aspects of the invention and could be re-written after each aspect with any necessary changes in wording. Not all such optional features are re-written after each aspect merely in the interests of brevity.

Embodiments of the present invention will now be described, by way of example only, with reference to the accompanying drawings, in which;

FIG. 1 schematically shows an object recognition enabled video surveillance system;

FIG. 2 schematically shows a body worn camera apparatus which forms part of the system shown in FIG. 1;

The surveillance system comprises a plurality of camera apparatus 1A, 1B each of which is connected via a communication channel to a central server 2. The central server 2 is connected to a storage facility 3 for storing recorded videos of a scene if desired and to customer viewing equipment 4 for allowing viewing of video captured by the camera apparatus 1A, 1B and/or information concerning object recognition, in particular facial recognition, events.

In this embodiment the camera apparatus 1A, 1B fall into two distinct categories, first there are body worn camera apparatus 1A and second there are freestanding or wall mounted camera apparatus 1B. In terms of the present ideas the structure functioning an operation of body worn camera apparatus 1A may be substantially the same as that of freestanding or wall mounted camera apparatus 1B. However, in other circumstances there may be differences which may for example take advantage of the fact that a freestanding or wall mounted camera apparatus 1B may have a fixed communication channel rather than a wireless communication channel available and may have access to mains power, greater processing speed and capabilities, and so on.

Figure 1:
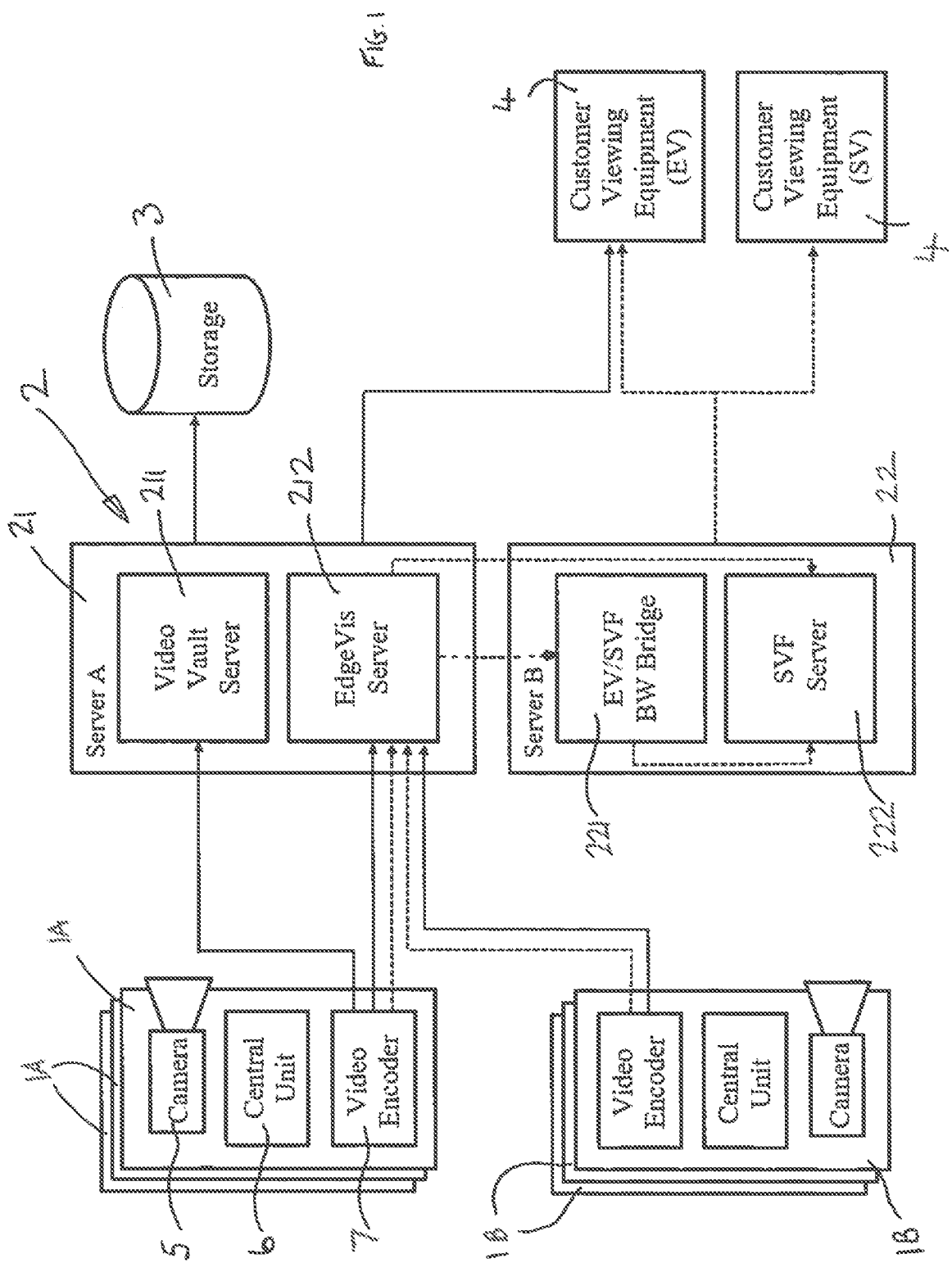
FIG. 1 shows an object recognition enabled video surveillance system which in this embodiment is a facial recognition enabled video surveillance system, which is arranged for capturing video of a scene and for allowing recognition of objects, specifically faces, within that scene.

FIG. 1 shows two camera apparatus 1A, 1B at some level of detail. As will be appreciated there may be almost any number of other camera apparatus 1A, 1B.

Each of the camera apparatus 1A, 1B comprises a camera 5, a central control unit 6 and a video encoder 7. Each camera apparatus 1A, 1B is arranged to capture video of a scene using the camera 5 under the control of the central control unit 6 and arranged to make use of the video encoder 7 to send this video back to the main server 2.

Further as will be described in more detail below, each camera apparatus 1A, 1B is arranged to send object recognition data back to the central server 2 along with the video data. The object recognition data is distinct from the video data. Both are sent back to the central server 2 over the same channel, but they are handled separately.

Thus each camera apparatus, 1A, 1B is arranged for capturing live video of a scene in sending this back to the central server 2 to allow real time display with minimum latency as well as sending object recognition data back to the central server 2.

In the present embodiment the object recognition data is facial recognition data.

In the present embodiment the central server 2 is made up of two server units 21, 22. The first server unit 21 includes a video vault server 211 which is arranged for receiving recorded video from camera apparatus 1A, 1B where it is desired to capture and send this. This recorded video may then be passed onto the storage facility 3. The capture of recorded video and storing of this in the storage facility 3 is not of particular relevance to the present invention and will not be described further. It is important to note however, that this capture and sending of recorded video is separate from the capture and sending of live video which is of more interest in the present invention.

The first server unit 21 also comprises an EdgeVis server 212 which is arranged for receiving live video of a scene from the camera apparatus 1A, 1B. This live video may then be fed from the EdgeVis server 212 to the customer viewing equipment 4 such that live video of a scene as captured by the camera apparatus 1A, 1B may be observed at the customer viewing equipment 4.

The EdgeVis server 212 is also arranged for receiving object recognition data from the camera apparatus 1A, 1B. This data is passed from the EdgeVis server 212 to the second server unit 22 of the central server 2 where it is optionally handled by a bridge unit 221 and passed to a SVF server 222. The SVF server 222 carries out facial recognition processing—which may include actual facial recognition activity and/or other analytics in relation to recognition data—and then passes object recognition events and data, in this embodiment in particular facial recognition events and data to the customer viewing equipment 4.

Thus, by monitoring the customer viewing equipment 4 the customer may be made aware of both facial recognition events as well as receiving live video from the respective camera apparatus 1A, 1B.

In operating the present ideas the object recognition data which is generated by the camera apparatus 1A, 1B and sent to the central server 2 may have different forms.

This data in some instances can comprise image data. In other instances it may comprise video clip data, and in yet other instances it may comprise data which results from image data and/or video clip data having been processed at the camera apparatus 1A, 1B.

Figure 2:
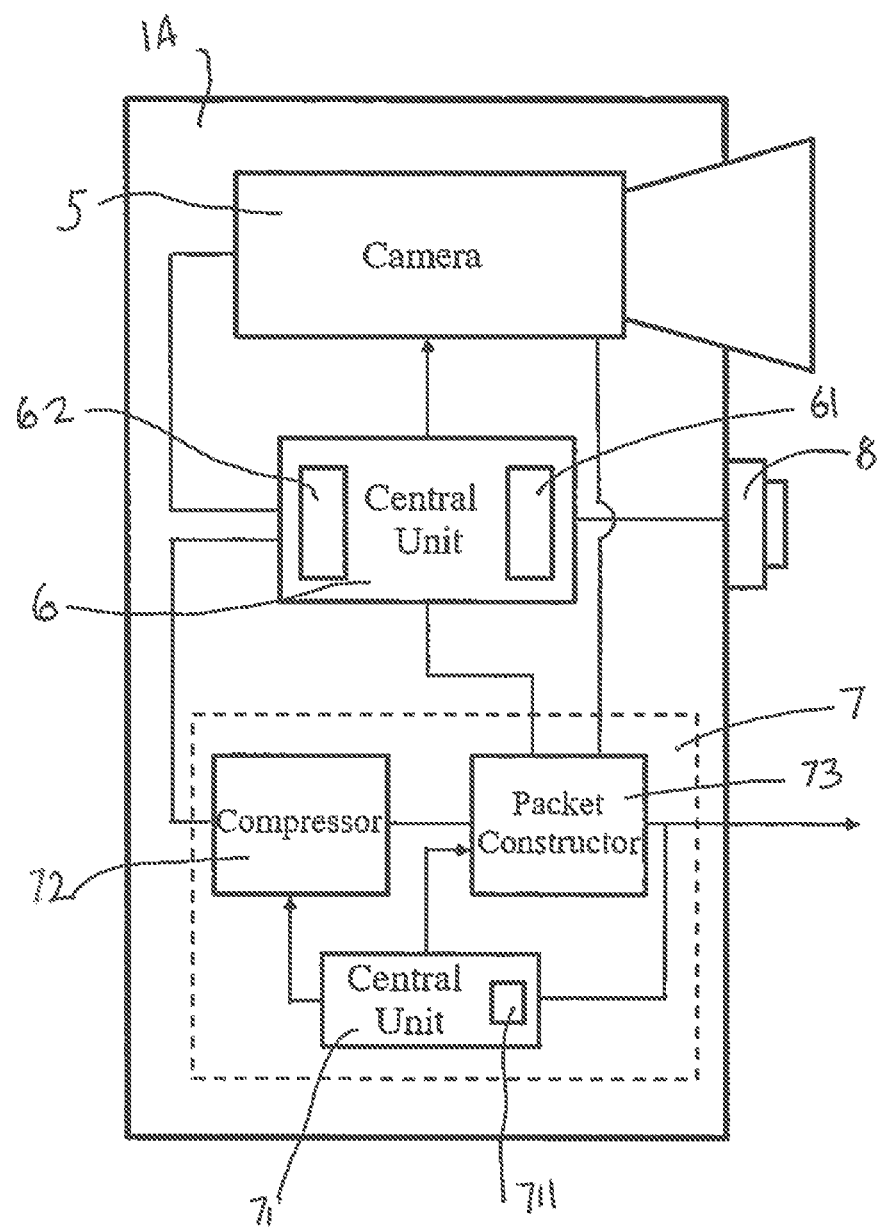

FIG. 2 shows a body worn camera apparatus 1A of the system in FIG. 1, still schematically but in more detail. A free standing or wall mounted camera apparatus 1B can have similar construction and operation as the body worn camera in many respect and thus further detailed description of the free standing or wall mounted camera is omitted.

As shown in the FIG. 2 the central unit 6 of the camera apparatus 1A comprises a face detection module 61 and a face recognition module 62.

In other embodiments these might more generally be an object detection module and an object recognition module.

Further the camera apparatus 1A comprises a trigger mechanism, in this case comprising a button 8, which can be used for capturing image data and/or video clip data for use as or in generating object recognition data.

Furthermore as shown in FIG. 2 the video encoder 7 comprises a video encoder central unit 71 which in turn comprises a channel monitor 711 for monitoring the available bandwidth and/or quality of the communication channel between the camera apparatus 1A and the central server 2. The video encoder 7 further comprises a compressor 71 and a packet constructor 73. The compressor 72 is arranged for receiving live video captured by the camera 5 and compressing this under control of the central unit 71. The packet constructor 73 is arranged for receiving the compressed video from the compressor 71 and object recognition data from the camera central unit 6 and/or camera 5 itself. The packet constructor 73 is arranged under the control of the video encoder central unit 71 for outputting this data for transmission to the central server 2.

Specifically the packet constructor 73 receives the video data from the compressor 72 and queues this along with the object recognition data and is controlled by the encoder central unit 71 so as to minimise latency in the live video data whilst sending the object recognition data when possible. To aid in this the control unit 71 takes into account the amount of object recognition data that is queued and the quality of the communication channel as indicated by the channel monitor 711 and where bandwidth is available causes the packet constructor 2 to send packets including the object recognition data. Furthermore where appropriate, the control unit 71 adjusts the compression of the live video stream at the compressor 72 to first of all ensure that latency of the live video stream is minimised (say when the bandwidth of the channel is poor) but also potentially increases the compression (reduces the size of the data needed to send the live video stream) in order to make room in the available bandwidth for sending object recognition data where such data is waiting to be sent. This may be controlled by reference to predetermined thresholds in terms of the size of this data and/or the time it has been waiting to be sent.

In this way it is possible to ensure that low latency live video is provided from the camera apparatus 1A whilst object recognition data is effectively communicated.

The compressor 72 may vary the quality of the video stream by, for example, reducing resolution or frame rate or detail.

As mentioned above the object recognition data may take various forms but in each case the functioning of the video encoder can be substantially the same. Its role is to ensure that this object recognition data is sent without interfering with the sending of live video surveillance data. Of course the quality of the live video surveillance data may be reduced whilst object recognition data needs to be sent but this is generally tolerable and much preferable to interrupting the stream of live video data or increasing the latency in the live video data stream.

Each camera apparatus 1A, 1B may be provided with a plurality of selectable modes of operation or any one camera apparatus may be provided with only one mode of operation. Described below are different modes of operations of the camera apparatus 1A.

In a first mode of operation the camera 5 continually captures video of a scene which is sent via the central unit 6 and the video encoder 7 to the central server 2 as a live video stream. Further in this mode of operation activation of object recognition and in particular facial recognition is driven by the user. When a user wishes to obtain a facial recognition result for a face currently in the scene the user presses the button 8. This causes the camera 5 to capture a high resolution image which will include the face.

In some examples this captured image could be treated as object recognition data and sent to the video encoder 7 (in particular the packet constructor 73) for sending along with the live video stream to the central server 2 for facial recognition processing.

However, more preferably than this use may be made of the face detection module 61 to detect faces in the image. The central unit 6 may then extract or crop out this portion of the image and send this smaller set of image data corresponding to the face or faces as the object recognition data for processing at the central server 2.

In yet a further alternative the face detection module 61 might be used to identify faces and data concerning the presence of the faces in the image may be sent along with the whole image as the object recognition data. Thus here the object recognition data would comprise the whole image as well as the face detection results from the face detection module 61.

Further information may be sent along with the image data as part of the object detection data. Metadata, for example relating to the time at which the image was taken or location data such as GPS data may be sent as part of the object recognition data.

In yet another alternative the results of the process carried out by the face detection module 61 may be passed to the facial recognition module 62 provided in the central unit such that facial recognition may be carried out in respect of the captured image. This may be carried out against a first watch list held at the camera apparatus 1A. If then a match is found an alert might be generated directly to the operator of the camera apparatus 1A.

Alternatively, if facial recognition is carried out at the central server 2 then an alert may be sent back to the camera apparatus 1A from the central server 2 if a match is found. Such an alter can again be object recognition data.

Where a facial recognition match is found at the camera apparatus 1A then the object recognition data may comprise data indicating that such a match has been found. In some circumstances this information would be sent alone and in other circumstances this may be sent along with the corresponding image data and/or with metadata.

In the circumstances where facial recognition is carried out at the camera apparatus 1A and no match is found, the image data may be passed to the central server 2 where matching against a larger watch list might also be carried out.

Whilst the above processes have been described with reference to capturing of image data it would be equally possible for all of the same steps to be carried out in respect of a video clip being captured upon activation of the button 8. That is a short segment of higher resolution video may be captured on pressing of the button 8. This may then be processed locally and/or sent to the central server as with the image data.

In yet a further similar example then rather than the activation of the button 8 causing special capture of an image by a new operation of the camera, activation of the button 8 may cause the central unit to generate or flag an image or a video clip as one being useful for facial recognition. This image or clip may then be processed locally or sent on for processing at the central server 2.

In one particular example the camera 5 may be operated so as to always take high-quality video which would be sufficient for carrying out facial recognition either on video clips or from stills taken from the video. Whereas the video encoder 7 is operated so that lower quality video is sent to the central server 2 in normal circumstances to minimise latency. In this case on activation of the button 8 a higher quality clip can be captured for processing in the camera apparatus 1A and/or for sending as object recognition data along with the general live video stream of lower quality.

To put this another way it may be the fact that the camera apparatus 1A is set up to send to the central unit a low quality video stream whereas it is set up to continuously capture a high-quality video stream which can be used for facial recognition as desired.

In another mode of operation, which is more automated, the camera apparatus 1A may be arranged so that the face detection module 61 continually monitors video captured by the camera 5 or stills captured by the camera 5 and where a face is detected, this triggers further operation. Thus for example, this may trigger capturing of a high-quality image or high-quality video clip. Further it may trigger facial recognition being carried out at the camera apparatus 1A where this is enabled by the presence of the facial recognition module 62 and/or it may trigger the sending of a high-quality image and/or a high-quality video clip as object recognition data back to the central server 2.

In yet a further mode of operation, a different type of trigger may be used for triggering image capture and/or facial recognition and/or video clip capture and/or sending of higher quality images/video clips back to the central server 2. This trigger might be an external control signal received from the central server 2 at the camera apparatus 1A. This perhaps may be initiated by action by a customer viewing the live video stream via the respective customer viewing equipment 4. Alternatively it might be triggered by an audio event detected at the camera apparatus 1A (where such sensor input is provided) or triggered by another predetermined condition detected by a sensor provided at the camera apparatus 1A such as a positional sensor, motion sensor or so on.

As appropriate the object recognition data may include any one or more of: a unique identification ID, an image captured, a bounding box indicating the location of a partial result ie object or face detection, a synchronised time-stamp, information about the device and video stream where the initial result was detected, any information about the results of initial analysis carried out at the camera apparatus.

The server apparatus 2 may operate under a series of rules such that data received at the server 2 as object recognition data may trigger further action such as sending a further message to an operator either of the camera apparatus 1 or the customer viewing equipment 4 or sending a message to another automated system. Further the server 2 may be arranged to carry out further processing in respect of the received object recognition data such as using any image or video clip included in the object recognition data or;

using a time-stamp or other identifying Metadata (such as a camera ID) to retrieve additional high-quality image data from the camera apparatus for further processing.

Furthermore the server apparatus 2 is arranged to associate together original object recognition data as well as the results of any processing carried out centrally for presentation at the customer viewing equipment 4 so that live video (either real time or later) can be viewed along with any corresponding object recognition data that has been generated and/or any data that has been centrally generated based on such object recognition data.

Where a limited watch list is provided at a camera apparatus 1A this might have say 50 targets which will be matched against in the facial recognition carried out at the camera apparatus 1A whereas on the central server 2 there might be a much larger watch list of say 5,000 targets.

Note that the capability for carrying out facial recognition or other analysis at a body worn camera 1A is likely to be less than at a freestanding or wall mounted camera apparatus 1B due to for example the performance of the device, available battery capacity, heat generation problems or other issues.

In general terms the overall process of the current systems might be described as including the following steps:

1. Capturing an image or video clip from a camera integrated into or connected to an edge device.

2. Processing the image or video clip using on-board analytics and generating an initial result and associated metadata.

3. Constructing a message containing the partial result, this message may include any of a unique identification ID, image captured, bounding box indicating the location of the partial result, a synchronised time-stamp, and information about the device and video stream where the initial result was detected, and any information about the results of the initial analysis such as the face detected or the type of object.

4. The message is transmitted over the EdgeVis message channel which may be along-side the live video (or independently if the live video is not currently being requested by a viewing client).

5. The message is detected by a process running on the server, which reads the content of the message.

6. Depending on the rules built into the server, it may trigger an immediate action such as sending of further message to an operator or an automated system.

7. At the same time, it may submit the message for further processing either:

using the image embedded in the message; or using the time-stamp and other identifying metadata (such as camera ID) to retrieve additional high-quality image data from the edge device which it will then process. It will retrieve this high-quality image data by request, without interrupting the live video stream.

8. The further processing will be completed using the larger resources available on the server and allow for detection of the additional categories of detail or search against larger watch-list or some other more detailed analytic than was run at the edge.

9. Once the detail processing is complete the result will be re-associated with the original live video stream sent over the low-bandwidth channel and synchronised by use of the time-stamps and identifying metadata or the unique identification ID for the same purpose.

10. The complete result combining the result of the analysis, detailed analysis and live video will be presented to the operator as a single output on their display (or separately if desired).

As alluded to above, the system may also be arranged to allow the capture, storage and subsequent output of video of the scene. Thus as well as live video, stored video may be output to a user, be this a remote user or the user of camera apparatus. This might be delivered along with other data including for example identification events.

In object recognition and in particular facial recognition the quality of the images used are important because low quality images are more likely to be found to match in error. For example, with a watch list database containing 10,000 enrolment images if 10,000 are good quality then the match rate will be good. However, if 100 of the images are blurry or badly lit then they will drastically increase the number of "false alerts" generated by the system despite the overall total of images still being the same.

Bad probe images (ie bad images captured by a camera apparatus in the above type of system) cause a related problem. Again these low quality images are more likely to generate false alerts.

A combination of low quality enrolment and probe images can cause particularly severe performance degradation.

There is an industry standard metric for measuring quality of images. This is called the ISO score. It combines a number of factors detected in the image (lighting, pose, focus) and generates a composite measure of image quality. This is particularly important in the context of a system present type because it is designed for use with both large databases and deployment on a large number of camera apparatus in difficult conditions. That is to say in outdoor real world locations. Therefore some of the images will almost certainly be of low quality. In a conventional system low quality images tend just to be rejected (and the image retaken where possible). However, in a system of the present type it is preferable to provide a more sophisticated system for dealing with low quality images.

In the present systems as applied to facial recognition the following process is followed:

1. Enrolment images are graded for ISO quality using an automated process.

2. Probe images are graded for ISO quality using an automated process.

3. When a match is detected the information encoded in the enrolment and probe quality scores is used to prioritise or filter the match according to work flow rules. High priority scores are more likely to be presented to an operator or sent as alerts to users in the field.

Figure 3:
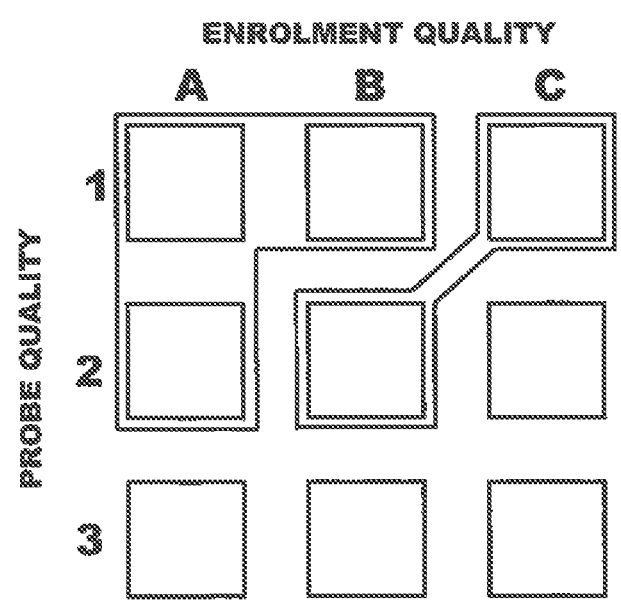
FIG. 3 shows a schema for prioritising recognition matches.

FIG. 3 schematically represents how a prioritisation may be implemented. In this case each enrolment image is classified as having a quality in one of 3 bands A, B and C with A being the highest quality and C being the lowest. Similarly each probe image is categorised into 3 quality bands with 1 being the highest quality and 3 being the lowest quality. Then as a system (eg the SVF server 22) is handling matches which are found by a facial recognition process these may be prioritised making use of these determined qualities of the enrolment and probe images.

In the present example, matches where the enrolment quality is of the highest level A and the probe quality is of the highest level 1, as well as, those matches where the enrolment quality is at the second level B whilst the probe quality is at the first level 1 and those where the enrolment quality is at the highest level A and the probe quality is at the second level 2 are treated as high priority matches. These then can be used to trigger an immediate alert.

On the other hand those matches where the enrolment image quality is of the lowest quality C whilst the probe image quality is of the highest quality 1 and those matches where the enrolment image quality is in the second quality category B and the probe image is in the second quality category 2 are queued for review when there are no immediate alerts to be dealt with by the system and its operators.

In this example implementation where the quality of the enrolment images and corresponding probe images do not meet one of these two tests, the matches are ignored.

Of course in other circumstances this might be modified and other factors used to decide that even though the probe image is of relatively low quality and the enrolment image is of relatively low quality further action is required. This further action might be some verification action or may require some additional factor to come into play. For example if the enrolment image relates to someone who is indicated as being a high priority then the match may be considered even though it does not meet the normal quality requirements.

The quality of enrolment images as well as the importance of an object, in particular a person, listed in a watch list may be taken into account not only in deciding how matches should be treated but also, or in an alternative, in a process for deciding the content of a watch list which should be sent to one or more camera apparatus.

Furthermore, in such a process the capabilities or resources of each camera apparatus may be taken into account. In some instances these capabilities may be acquired at installation and stored in the system but preferably these capabilities are detected by the system as part of the decision making process so that up to date data can be used without a separate collection process being required. That is, part of the decision making process at the central system for deciding what objects/faces should be included in a watch list for a camera apparatus may include interrogating the respective camera apparatus to determine its capabilities.

Figure 4:
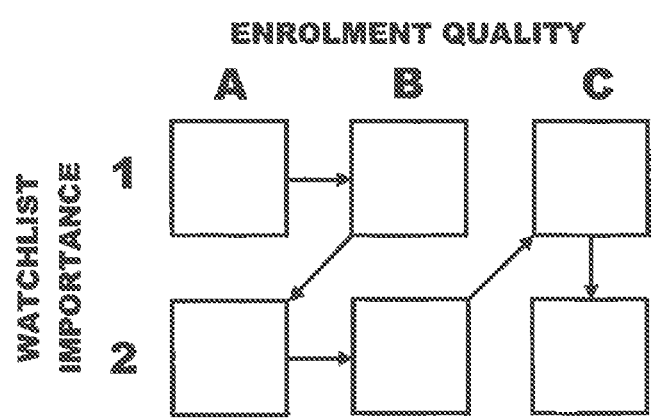
FIG. 4 shows a schema for determining what items to include in a watch list for provision to a camera apparatus.

FIG. 4 schematically shows how such a decision making process may be carried out. Here each item corresponding to a particular object or more particularly a particular face in a watch list is given an importance level. Here two important levels are given namely 1 and 2, where importance level 1 indicates that this object/person is of high importance. Correspondingly each enrolment image is assessed as to quality as mentioned above and put into one of three categories A, B and C. Then in determining which objects/faces should be included in a watch list for provision to a camera apparatus the following path may be followed. That is to say with a knowledge of the resources which exist at the camera apparatus which set a maximum number of items which should be included in a custom watch list, the items in the watch list are selected according to the following pattern. First those items in the main watch list which correspond to a person of importance 1 with an enrolment image of quality A are selected, then those items with an importance level of 1 and an image quality level of B, then the items of an importance level of 2 and an image quality level of A, then the items with an importance level of 2 and an image quality level of B and then only after this, items with importance level 1 but an image quality level of C and then finally items with an importance level of 2 and an image quality of C.

Of course further levels in terms of image quality or importance level may be included in such a decision making process.

When determining the capabilities of each camera apparatus in order to determine the respective watch list, factors which may be taken into account include: the available processing power of the camera apparatus and/or the available battery power.

Note that in some instances an object or facial recognition process may be carried out both at the camera apparatus and also at a central location eg at the server. In such a case a deeper level of analysis may be carried out at the server perhaps to give a higher degree of certainty of match or to further classify the object which has been recognised.

Figure 5:
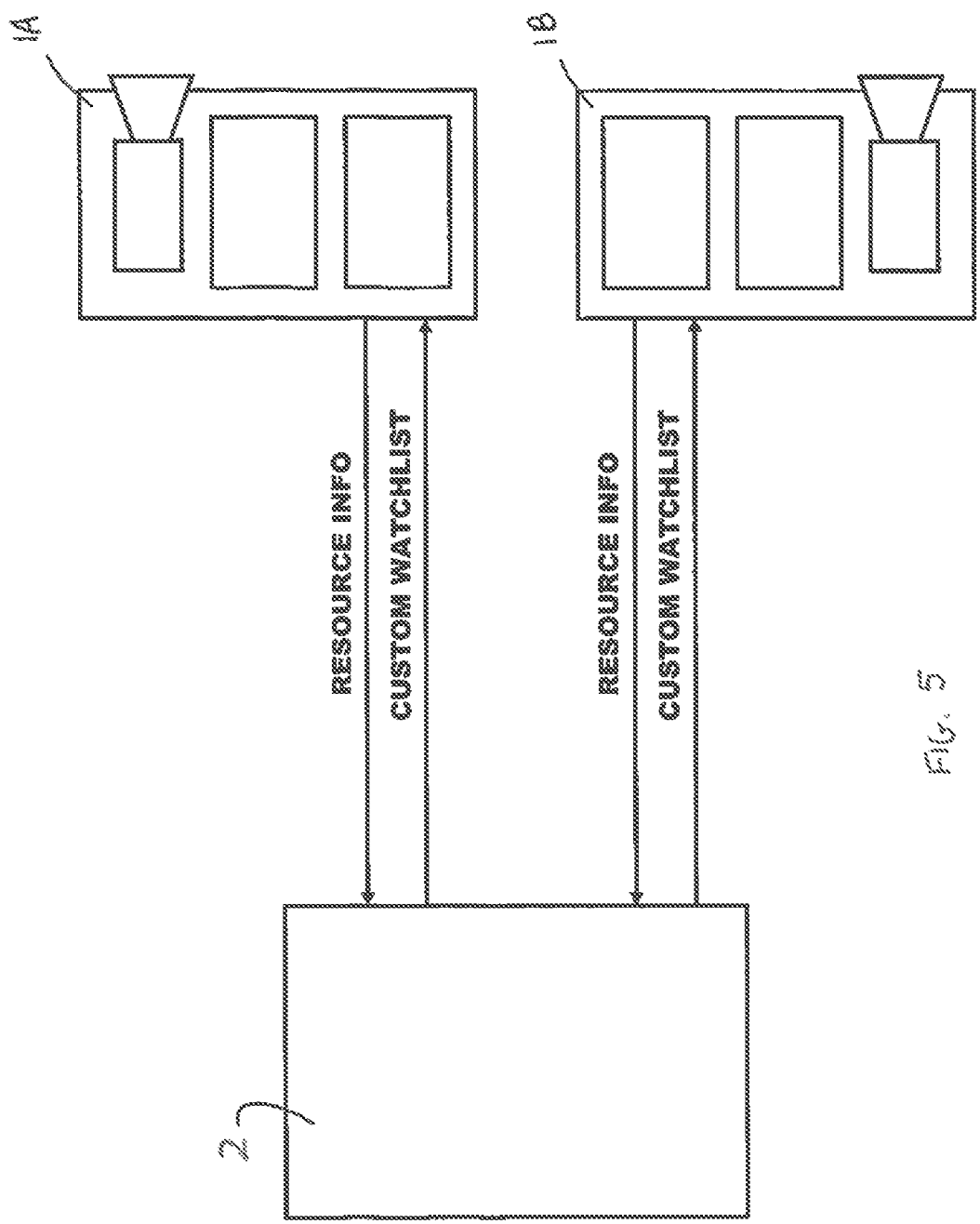
FIG. 5 shows the process of assigning custom watch lists to camera apparatus.

FIG. 5 schematically shows the process of gathering resource information from a plurality of camera apparatus 1A, 1B at the central server 2 and then sending out to each camera apparatus 1A, 1B a custom watch list appropriate for that device using the decision making process described above in relation to FIG. 4. For example some camera apparatus may be street mounted with mains power and advanced processing capabilities. Others may be mobile devices, say body worn cameras.

As alluded to above, in some situations an image originally captured in respect of an object or person of interest may be of poor quality rendering accurate recognition difficult. Thus in a particular implementation the surveillance system may serve to issue a prompt to user to attempt to acquire a better image. In one particular example the initial image may be acquired by a fixed camera at a known location or from a vehicle mounted camera at a location which is determined at the time when the image was acquired. This initial match may then be used to inform a user of a mobile apparatus of the match and provide them with an instruction to attempt to obtain a better image.

Figure 6:
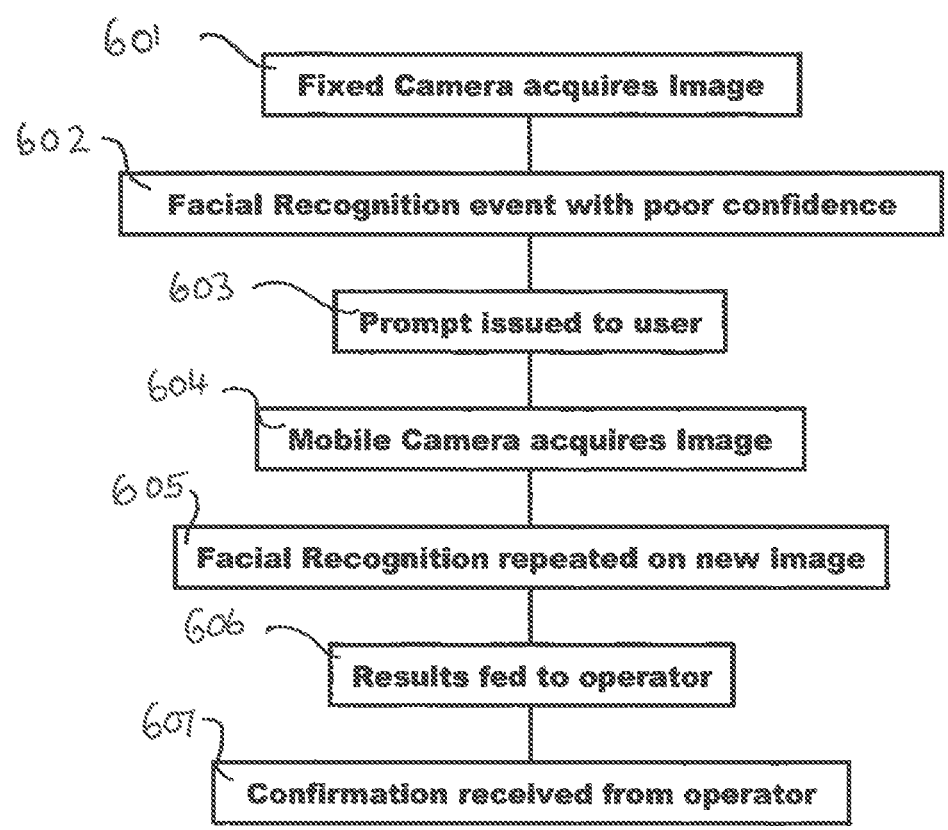
FIG. 6 shows a flow chart illustrating a process for verifying a recognition match.

FIG. 6 illustrates a process which the surveillance apparatus may be arranged to carry out in such a scenario.

In step 601 a fixed camera such as a street mounted camera acquires image of a subject which may be of interest. In step 602 an initial facial recognition is carried out either at the camera apparatus or centrally which gives an indication of a match but with a poor level of confidence.

As a result of this, in step 603 a prompt is issued to the operator of a mobile camera apparatus that a person of interest is in their general locality.

This prompt can include the location where the original image was acquired, a copy of the enrolment image for that subject and a copy of the probe image for that subject.

The user then can attempt to locate the person and assuming that they do, then in step 604 a new probe image can be captured and in step 605, facial recognition can be carried out in respect of the new probe image. The results of this second facial recognition process can be fed to an operator in step 606—this may be a remote operator and/or the operator of the mobile camera apparatus. These results can include the enrolment image, the original probe image and the second probe image. The operator or operators viewing this can then take appropriate action and the system is arranged at step 607 to accept confirmation from an operator that the facial recognition appears to have correctly identified the subject. This confirmation can then set in train further action by the system.

In this way human judgement can be brought into the recognition process. Of course human judgement could be introduced in other ways, at other stages, or in other matching processes.

Similar ideas and processes to the above for prioritisation and verification may be used in object recognition systems of other types—say, for example, vehicle recognition systems.

As will be appreciated various of the above ideas may be embodied in a computer program which when loaded run on a computer of camera apparatus or a server cause it to operate as described above. Such a program may be stored on a machine readable physical data carrier.

The present systems can facilitate video surveillance with facial (or other object) recognition over low bandwidth channels by separating the issue of providing video surveillance from the issue of object recognition noting that there are different primary requirements for each ("low quality and fast" is ok for live video, "high quality but slow" is ok for face recognition) and generating two difference types of data—the (live) surveillance video data and the object recognition data—and handling the communication of these separately but still utilising the same channel. Further in at least some cases the system is further helped by carrying out part of the processing locally and part centrally.

Below are further comments concerning the overall operation of systems of the present type as well as some particular uses of, or tasks that may be carried out using systems of the present type.

The system may be one where information is gathered from cameras that are distributed through an area, which might be an industrial site, or city, or country. The information is available to a range of review processes, which might include analytics and human review.

Cameras might be fixed, vehicle based, body-worn, covert, or of any type. The system's cameras are frequently mobile or re-deployable cameras but may also be augmented by fixed cameras. Additional information may be gathered from a range of supplementary sensors in order to add to the information gathered from the visual sensors.

The system addresses three related problems which are;
Gathering image and other data,
Moving the data to where processing can be done,
Management of human-aided review and correlation, where this is required in addition to automated decision making Typical applications of the system include;
Finding and tracking individuals over the monitored area.
Association, finding out who a person who has been seen with.
Identify collusion through association.
Finding vehicles which are associated with a known individual, or a crime.
Finding all the people who have been in a vehicle.
Analysing who has been in and out of an area, or through a checkpoint or checkpoints.
Analysing who has been to multiple sites, for example visited several power stations.
Identify people who have visited the same sites over multiple days.
Monitoring drivers who break traffic rules, for example by going the wrong way, by analysing location data. This may include monitoring speeding through location analysis, including for vehicles which don't require number plates but where other identifying features such as the driver's face is visible.

Identifying if drivers in vehicles are properly licensed, including for the class of vehicle being operated or service they are providing.

Allowing police to connect to surveillance systems of multiple private companies and ingest data in order to process it for correlations.

Finding missing children.

Identifying individuals attending unlawful events and associates they meet with in other contexts.

Identifying objects of certain types throughout the city, for example types of vehicle or abandoned luggage Identifying the people persons or other objects associated with the object being searched for. For example, identifying who left an item in a station.

Finding all the people who have held or been close to a specific object, for example a firearm.

The system may facilitate these goals by automatic enrolment of all unknown faces or objects it sees. Once it has recorded an image of a suspect or object in one part of the city, it will then facilitate searching for the subject or object at all the cameras in the network, as well as any other subjects or objects related to the subject.

Gathering image data creates a large amount of data, often enough to overwhelm fixed links. It is especially challenging to move this image data over wireless networks.

There are two traditional approaches to addressing this problem, which are to:

Distribute processing so that not too much data has to be moved over the network.

Use a lot of network capacity to centralise processing at a central location so all of the data can be considered in context.

The uses previously mentioned benefit from central processing, because correlation requires knowledge of all the data being input into the network. Central processing can be impractical because of the difficulty of moving video data. In particular the approach of moving all the video over high-bandwidth links is incompatible with also streaming video data from the cameras at the same time, especially mobile cameras.

The system is more efficient than previous approaches because of efficient coding of the video data, which permits some of the channel to be used for:

Watch-lists which are distributed from the central system, which filter the data being sent to the centre for final analysis. The watch-lists may be customised to the resources of the specific device or class of device they are being sent to. If bandwidth is available, the system may take all the video data to the centre for detailed processing.

Return of results of the analysis conducted at the edge.

Results might be displayed to the operator as:

Time based display.

Geographic display.

A display which links geography and time, for example to show the likely track a person has taken by using a routing algorithm to identify the most likely routes. Routing algorithm options might be combined with knowledge of timings to filter or promote certain routes e.g. timings which tie up with public transport history, or which would have taken too long.

A display which shows people who might have taken similar routes, e.g. who might have been on a similar train.

Alerts which are shown to users on the ground providing them with some or all of the above information.

Alerts which are sent as task-based instructions to investigate while providing all, some, or none, of the context available to the system based on the profile of the user.

A report analysing the history or actions of any of the people or objects identified by the system.

In addition to video data other types of data may also be captured and processed for the same purpose, for example audio data.

The system might bring in records from other systems such credit card transaction data, ALPR systems, or other databases in order to correlate or prioritise results for review.

The invention claimed is:

1. An object recognition enabled video surveillance system for capturing video of a scene and allowing recognition of objects within that scene, the system comprising
at least one camera apparatus connected via a communication channel to a central server,
the camera apparatus arranged for capturing visual representation data of a scene, the visual representation data comprising video of the scene and the camera apparatus comprising a camera for capturing said video and a video encoder for sending corresponding video data via the communication channel to the central server,
the camera apparatus being further arranged for generating object recognition data based on said visual representation data,
and the video encoder being arranged to send said object recognition data along with the video data via the communication channel to the central server, wherein
i) the camera apparatus is arranged to conduct object recognition against a first watch list of objects held at the camera apparatus and the camera is arranged to generate an object recognised alert when an object of interest is found to match with an object on the first watch list and the camera apparatus is arranged to send said object recognised alerts as object recognition data to the central server;
ii) the camera apparatus is arranged to send captured image data/captured video clip data as object recognition data to the central server where the captured image data/captured video clip data corresponds to a captured image/video clip in which an object of interest has been detected by the camera apparatus when the object of interest is found to match with an object on the first watch list; and
iii) the central server is arranged to conduct object recognition against a main watch list of objects held at the server based on captured image data/captured video clip data supplied from the camera apparatus.

2. An object recognition enabled video surveillance system according to claim 1 in which the surveillance system is arranged to carry out a two stage object recognition process comprising a first object detection process and a second object classification process.

3. An object recognition enabled video surveillance system according to claim 1 or claim 2 in which the visual representation data comprises said video data and auxiliary visual representation data and the camera apparatus is arranged for generating object recognition data based on the auxiliary visual representation data.

4. An object recognition enabled video surveillance system according to claim 3 in which the auxiliary visual representation data comprises image data.

5. An object recognition enabled video surveillance system according to claim 3 in which the auxiliary visual representation data comprises auxiliary video data with a higher resolution or other quality factor than said video data.

6. An object recognition enabled video surveillance system according to claim 1 in which the camera apparatus is further arranged for capturing images of said scene and generating object recognition data based on said captured images.

7. An object recognition enabled video surveillance system according to claim 1 in which the object recognition data comprises captured image data.

8. An object recognition enabled video surveillance system according to claim 1 in which the camera apparatus is configured for detecting the presence of objects of interest in said visual representation data.

9. An object recognition enabled video surveillance system according to claim 8 in which the camera apparatus is arranged to send captured image data as object recognition data where the captured image data corresponds to a captured image in which an object of interest has been detected.

10. An object recognition enabled video surveillance system according to claim 8 in which the camera apparatus is arranged to send captured video clip data as object recognition data where the captured video clip data corresponds to a captured video in which an object of interest has been detected.

11. An object recognition enabled video surveillance system according to claim 1 in which the camera apparatus comprises an object recognition module for classifying objects in captured images and/or video clips.

12. An object recognition enabled video surveillance system according to claim 11 in which the object recognition module at the camera apparatus is arranged to conduct object recognition against a first watch list of objects held at the camera apparatus and the object recognition module is arranged to generate an object recognised alert when an object of interest is found to match with an object on the first watch list.

13. An object recognition enabled video surveillance system according to claim 12 in which:
  i) the object recognition module at the camera apparatus is arranged to conduct object recognition against the first watch list of objects held at the camera apparatus and the object recognition module is arranged to generate an object recognised alert when an object of interest is found to match with an object on the first watch list and the camera apparatus is arranged to send said object recognised alerts as object recognition data; and
  ii) the camera apparatus is arranged to send captured image data/captured video clip data as object recognition data where the captured image data/captured video clip data corresponds to a captured image/video clip in which an object of interest has been detected but the object of interest is found to not match with an object on the first watch list.

14. An object recognition enabled video surveillance system according to claim 12 in which the system is arranged for determining the content of the first watch list for provision to the camera apparatus in dependence on:
  the content of the main watch list; and
  at least one of the following factors:
  i) at least one capability of the camera apparatus as detected by the system;
  ii) a priority value given to objects on the main watch list;
  iii) the quality of enrollment images held in respect of objects on the main watch list.

15. An object recognition enabled video surveillance system according to claim 12 in which the video surveillance system comprises a watch list database comprising enrollment images in respect of objects in the watch list and the video surveillance system is arranged for treating the captured image or video clip as a probe image and conducting object recognition by processing the enrollment images and probe images, wherein the video surveillance system is further arranged for determining a quality of each enrollment image and/or each probe image and using said determined quality in conducting object recognition.

16. An object recognition enabled video surveillance system according to claim 15 in which the system is arranged to prioritise results where a match is found and image quality of one or both images is above a respective threshold or thresholds.

17. An object recognition enabled video surveillance system according to claim 15 in which the system is arranged to adjust a threshold of results of a recognition process which will be considered to be a valid match based on the image quality of one or both images.

18. An object recognition enabled video surveillance system according to claim 1 which comprises trigger means for triggering the capture of images and/or video clips.

19. An object recognition enabled video surveillance system according to claim 18 in which the trigger means comprises a manually operated trigger control.

20. An object recognition enabled video surveillance system according to claim 18 in which the trigger means comprises a triggering module for triggering capture of an image/video clip based on predetermined conditions and configured for carrying out object detection on candidate captured images and/or candidate captured video clips and the triggering module is arranged to trigger capture of an image and/or a video clip when an object of interest is detected in a respective candidate captured image and/or video clip.

21. An object recognition enabled video surveillance system according to claim 1 in which the surveillance system is arranged to issue a prompt to acquire a further image/video clip in response to a match being found using a first image, wherein the surveillance system comprises at least one first camera apparatus and at least one mobile camera apparatus and the system is arranged to issue a prompt to the operator of the mobile camera apparatus to seek to acquire a second image/video clip of an object in respect of which an image/video clip has already been captured by the first camera which resulted in a match against a watch list.

22. An object recognition enabled video surveillance system according to claim 21 in which output to a user may comprise the first image and/or the second image and/or an enrollment image.

23. An object recognition enabled video surveillance system according to claim 1 in which the system is arranged to allow the collection of, storage of, and later output of video data relating to a scene.

24. An object recognition enabled video surveillance system according to claim 1 in which the video encoder comprises a compressor to compress video data and the compressor is arranged to compress video data using an adjustable compression factor.

25. An object recognition enabled video surveillance system according to claim 24 in which the video encoder comprises a packet constructor configured to receive compressed video data from the compressor, to receive object recognition data, to queue the compressed video data and object recognition data for transmission, to construct data packets from the queued data, and to transmit the constructed data packets over the channel.

26. An object recognition enabled video surveillance system according to claim 25 in which the video encoder comprises a channel monitor configured to monitor the performance of the channel based on the behaviour of transmitted data packets, and the compressor is configured to modify the adjustable compression factor in response to the performance of the channel, as determined by the channel monitor.

27. An object recognition enabled video surveillance system according to claim 26 in which the video compressor is arranged to modify the compression factor in response to performance of the channel and the amount of object recognition data received by the packet constructor.

28. An object recognition enabled video surveillance system according to claim 1 in which the object recognition enabled video surveillance system is a facial recognition enabled video surveillance system for capturing video of the scene and allowing recognition of faces within that scene.

29. A non-transitory machine readable data carrier carrying a computer program or set of computer programs which when loaded and run on a surveillance system including camera apparatus and a server cause the surveillance system including camera apparatus and a server to operate as a object recognition enabled video surveillance system, as claimed in claim 1.

30. A camera apparatus for use in an object recognition enabled video surveillance system for capturing video of a scene and allowing recognition of objects within that scene,
the camera apparatus being arranged for communication with a central server via a communication channel and arranged for capturing visual representation data of a scene, the visual representation data comprising video of the scene and the camera apparatus comprising a camera for capturing said video and a video encoder for sending corresponding video data via the communication channel to the central server,
the camera apparatus being further arranged for generating object recognition data based on said visual representation data,
and the video encoder being arranged to send said object recognition data along with the video data via the communication channel to the central server, wherein
i) the camera apparatus is arranged to conduct object recognition against a first watch list of objects held at the camera apparatus and the camera is arranged to generate an object recognised alert when an object of interest is found to match with an object on the first watch list and the camera apparatus is arranged to send said object recognised alerts as object recognition data to the central server;
ii) the camera apparatus is arranged to send captured image data/captured video clip data as object recognition data to the central server where the captured image data/captured video clip data corresponds to a captured image/video clip in which an object of interest has been detected by the camera apparatus when the object of interest is found to match with an object on the first watch list; and
iii) the central server is arranged to conduct object recognition against a main watch list of objects held at the server based on captured image data/captured video clip data supplied from the camera apparatus.

31. A non-transitory machine readable data carrier carrying a computer program or set of computer programs which when loaded and run on a computer of a camera apparatus cause the camera apparatus to operate as camera apparatus, as claimed in claim 3.

32. A facial recognition enabled video surveillance system for capturing video of a scene and allowing recognition of faces within that scene, the system comprising
at least one camera apparatus connected via a communication channel to a central server,
the camera apparatus comprising a camera for capturing video of a scene and a video encoder for sending corresponding video data via the communication channel to the central server,
the camera apparatus being further arranged for capturing images of said scene and generating facial recognition data based on said captured images,
and the video encoder being arranged to send said facial recognition data along with the video data via the communication channel to the central server, wherein
i) the camera apparatus is arranged to conduct facial recognition against a first watch list of faces held at the camera apparatus and the camera is arranged to generate a face recognised alert when a face of interest is found to match with a face on the first watch list and the camera apparatus is arranged to send said face recognised alerts as face recognition data to the central server;
ii) the camera apparatus is arranged to send captured image data as face recognition data to the central server where the captured image data corresponds to a captured image in which a face of interest has been detected by the camera apparatus when the face of interest is found to match with a face on the first watch list; and
iii) the central server is arranged to conduct facial recognition against a main watch list of faces held at the server based on captured image data supplied from the camera apparatus.

33. A facial recognition enabled video surveillance system for capturing video of a scene and allowing recognition of faces within that scene, the system comprising
at least one camera apparatus connected via a communication channel to a central server,
the camera apparatus comprising a camera for capturing video of a scene and a video encoder for sending corresponding video data via the communication channel to the central server,
the camera apparatus being further arranged for capturing images and/or video clips of said scene and generating facial recognition data based on said captured images and/or video clips,
and the video encoder being arranged to send said facial recognition data along with the video data via the communication channel to the central server, wherein
i) the camera apparatus is arranged to conduct facial recognition against a first watch list of faces held at the camera apparatus and the camera is arranged to generate a face recognised alert when a face of interest is found to match with a face on the first watch list and the camera apparatus is arranged to send said face recognised alerts as face recognition data to the central server;
ii) the camera apparatus is arranged to send captured image data/captured video clip data as face recognition data to the central server where the captured image data/captured video clip data corresponds to a captured image/video clip in which a face of interest has been detected by the camera apparatus when the face of interest is found to match with a face on the first watch list; and iii) the central server is arranged to conduct facial recognition against a main watch list of faces held at the server based on captured image data/captured video clip data supplied from the camera apparatus.

34. A facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server for reconstruction of video at a first quality, the camera apparatus being further arranged for capturing video clips of said scene at a second quality which is higher than the first and generating facial recognition data based on said captured video clips, and the video encoder being arranged to send said facial recognition data along with the video data via the communication channel to the central server, wherein i) the camera apparatus is arranged to conduct facial recognition against a first watch list of faces held at the camera apparatus and the camera is arranged to generate a face recognised alert when a face of interest is found to match with a face on the first watch list and the camera apparatus is arranged to send said face recognised alerts as face recognition data to the central server;

ii) the camera apparatus is arranged to send captured video clip data as face recognition data to the central server where the captured video clip data corresponds to a captured video clip in which a face of interest has been detected by the camera apparatus when the face of interest is found to match with a face on the first watch list; and iii) the central server is arranged to conduct facial recognition against a main watch list of faces held at the server based on captured image data supplied from the camera apparatus.

35. A facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server, the camera apparatus being further arranged for capturing images of said scene and comprising a face detection module for detecting faces in said captured images, the camera apparatus being arranged to generate detected face image data sets in response to detection of faces by the face detection module, each detected face image data set including image data in respect of a detected face, and the video encoder being arranged to send said detected face image data sets along with the video data via the communication channel to the central server, wherein i) the camera apparatus is arranged to conduct facial recognition against a first watch list of faces held at the camera apparatus and the camera is arranged to generate a face recognised alert when a face of interest is found to match with a face on the first watch list and the camera apparatus is arranged to send said face recognised alerts as face recognition data to the central server;

ii) the camera apparatus is arranged to send captured image data as face recognition data to the central server where the captured image data corresponds to a captured image in which a face of interest has been detected by the camera apparatus when the face of interest is found to match with a face on the first watch list; and iii) the central server is arranged to conduct facial recognition against a main watch list of faces held at the server based on captured image data supplied from the camera apparatus.

36. A facial recognition enabled video surveillance system for capturing video of a scene and allowing recognition of faces within that scene, the system comprising at least one camera apparatus connected via a communication channel to a central server, the camera apparatus comprising a camera for capturing video of a scene and a video encoder for sending corresponding video data via the communication channel to the central server, the camera apparatus being further arranged for capturing images and/or video clips of said scene and comprising a face detection module for detecting faces in said captured images and/or video clips, the camera apparatus being arranged to generate detected face image/video data sets in response to detection of faces by the face detection module, each detected face image/video data set including image/video data in respect of a detected face, and the video encoder being arranged to send said detected face image/video data sets along with the video data via the communication channel to the central server, wherein i) the camera apparatus is arranged to conduct facial recognition against a first watch list of faces held at the camera apparatus and the camera is arranged to generate a face recognised alert when a face of interest is found to match with a face on the first watch list and the camera apparatus is arranged to send said face recognised alerts as face recognition data to the central server;

ii) the camera apparatus is arranged to send captured image data as face recognition data to the central server where the captured image data corresponds to a captured image in which a face of interest has been detected by the camera apparatus when the face of interest is found to match with a face on the first watch list; and iii) the central server is arranged to conduct facial recognition against a main watch list of faces held at the server based on captured image data supplied from the camera apparatus.

37. An object recognition enabled video surveillance system for capturing video of a scene and allowing recognition of objects within that scene, the system comprising at least one camera apparatus connected via a communication channel to a central server, the camera apparatus arranged for capturing visual representation data of a scene, the visual representation data comprising video of the scene and the camera apparatus comprising a camera for capturing said video and a video encoder for sending corresponding video data via the communication channel to the central server, the camera apparatus being further arranged for generating object recognition data based on said visual representation data, and the video encoder being arranged to send said object recognition data along with the video data via the communication channel to the central server, wherein the camera apparatus is arranged to conduct object recognition against a first watch list of objects held at the camera apparatus and the camera apparatus is arranged to generate an object recognised alert when an object of interest is found to match with an object on the first watch list; and the system is arranged for determining the content of the first watch list for provision to the camera apparatus in dependence on:

the content of a main watch list held at the central server;
a priority value given to objects on the main watch list; and
at least one of the following factors:
  i) at least one capability of the camera apparatus as detected by the system; and
  ii) the quality of enrollment images held in respect of objects on the main watch list.

38. An object recognition enabled video surveillance system for capturing video of a scene and allowing recognition of objects within that scene, the system comprising at least one camera apparatus connected via a communication channel to a central server, the camera apparatus arranged for capturing visual representation data of a scene, the visual representation data comprising video of the scene and the camera apparatus comprising a camera for capturing said video and a video encoder for sending corresponding video data via the communication channel to the central server, the camera apparatus being further arranged for generating object recognition data based on said visual representation data, and the video encoder being arranged to send said object recognition data along with the video data via the communication channel to the central server, wherein the video surveillance system comprises a watch list database comprising enrollment images in respect of objects in the watch list and the video surveillance system is arranged for treating the captured image or video clip as a probe image and conducting object recognition by processing the enrollment images and probe images, wherein the video surveillance system is further arranged for determining a quality of each enrollment image and each probe image and using said determined quality in conducting object recognition, and wherein the video surveillance system is arranged to:
accept results as a valid match where a match is found and image quality of the enrolment image and the image quality of the probe image together meet a combined threshold metric; and
reject results as an invalid match where even though a match is found, where the image quality of the enrolment image and the image quality of the probe image together fail to meet a combined threshold metric.

39. An object recognition enabled video surveillance system for capturing video of a scene and allowing recognition of objects within that scene, the system comprising at least one camera apparatus connected via a communication channel to a central server, the camera apparatus arranged for capturing visual representation data of a scene, the visual representation data comprising video of the scene and the camera apparatus comprising a camera for capturing said video and a video encoder for sending corresponding video data via the communication channel to the central server, the camera apparatus being further arranged for generating object recognition data based on said visual representation data, and the video encoder being arranged to send said object recognition data along with the video data via the communication channel to the central server, wherein, the surveillance system is arranged to issue a prompt to acquire a further image/video clip in response to an initial match being found against a watch list using a first image/video clip, wherein the surveillance system comprises at least one first camera apparatus and at least one mobile camera apparatus and the system is arranged to issue the prompt to an operator of the mobile camera apparatus to seek to acquire a second image/video clip of an object in respect of which the first image/video clip was captured by the first camera which resulted in the match against the watch list, wherein the surveillance system is arranged to conduct object recognition against the watch list using said second image/video clip and to:
  i) confirm the initial match if conducting object recognition against the watch list using said second image/video clip results in a match; and
  ii) ignore the initial match if conducting object recognition against the watch list using said second image/video clip does not result in a match.

40. An object recognition enabled video surveillance system for capturing video of a scene and allowing recognition of objects within that scene, the system comprising at least one camera apparatus connected via a communication channel to a central server, the camera apparatus arranged for capturing visual representation data of a scene, the visual representation data comprising video of the scene and the camera apparatus comprising a camera for capturing said video and a video encoder for sending corresponding video data via the communication channel to the central server, the camera apparatus being further arranged for generating object recognition data based on said visual representation data, and the video encoder being arranged to send said object recognition data along with the video data via the communication channel to the central server, wherein, the video encoder comprises a compressor to compress video data and the compressor is arranged to compress video data using an adjustable compression factor;

the video encoder comprises a packet constructor configured to receive compressed video data from the compressor, to receive object recognition data, to queue the compressed video data and object recognition data for transmission, to construct data packets from the queued data, and to transmit the constructed data packets over the channel;

the video encoder comprises a channel monitor configured to monitor the performance of the channel based on the behaviour of transmitted data packets, and the compressor is configured to modify the adjustable compression factor in response to the performance of the channel, as determined by the channel monitor, and in response to the amount of object recognition data received by the packet constructor.

* * * * *